(12) United States Patent
Kim et al.

(10) Patent No.: US 8,204,489 B2
(45) Date of Patent: Jun. 19, 2012

(54) MOBILE TERMINAL AND METHOD OF CONTROLLING DATA TRANSMISSION AND RECEPTION THEREIN

(75) Inventors: Dong Ho Kim, Gyeoggi-do (KR); Young Wan Lim, Seoul (KR); Il Won, Seoul (KR)

(73) Assignee: LG Electronics Inc., Seoul (KR)

( * ) Notice: Subject to any disclaimer, the term of this patent is extended or adjusted under 35 U.S.C. 154(b) by 338 days.

(21) Appl. No.: 12/553,009

(22) Filed: Sep. 2, 2009

(65) Prior Publication Data
US 2010/0267348 A1   Oct. 21, 2010

(30) Foreign Application Priority Data
Apr. 21, 2009 (KR) .................. 10-2009-0034543

(51) Int. Cl.
*H04L 29/08* (2006.01)
(52) U.S. Cl. .................. 455/414.4; 455/414.1; 455/418; 455/456.1; 455/456.3; 455/67.11; 455/67.13; 455/552.1; 455/565; 455/566; 455/567; 455/90.1; 340/539.1; 340/539.22; 340/539.23
(58) Field of Classification Search ........ 455/41.1–41.2, 455/404.1–404.2, 414.1–414.2, 456.1–456.3, 455/556.1–556.2, 410–411, 412.1–412.2, 455/413, 415, 418, 456.6, 90.1–90.2, 552.1, 455/553.1, 67.11, 67.13, 414.3–414.4, 565–567, 455/68–69; 340/539.1, 539.11–539.13, 572.1, 340/573.1, 539.22–539.29
See application file for complete search history.

(56) References Cited

U.S. PATENT DOCUMENTS

| | | | |
|---|---|---|---|
| 6,992,580 B2 * | 1/2006 | Kotzin et al. ............ 340/539.11 |
| 7,313,383 B2 * | 12/2007 | Fujii ............................. 455/410 |
| 7,634,299 B2 * | 12/2009 | Mise et al. .................... 455/567 |
| 2006/0109102 A1 * | 5/2006 | Gortz et al. .................. 340/531 |

* cited by examiner

*Primary Examiner* — Tuan A Tran
(74) *Attorney, Agent, or Firm* — Lee, Hong, Degerman, Kang & Waimey

(57) ABSTRACT

A mobile terminal and method of controlling data transmission and reception therein are disclosed. In a mobile terminal selectively performing a data transceiving operation or a signal transceiving operation, the present invention includes performing the data transceiving operation, determining whether the data transceiving operation in the course of being performed meets a prior execution condition, if the data transceiving operation in the course of being performed by the wireless communication unit meets the prior execution condition, setting up a data prior mode for enabling the data transceiving operation to be performed prior to the call signal transceiving operation, wherein as the data prior mode is set up, if the call signal transceiving operation is detected, the data transceiving operation is preferentially performed. Accordingly, a data transceiving operation can be performed prior to a call signal transceiving operation despite that a hybrid mode is set.

16 Claims, 25 Drawing Sheets

FIG. 6

Prior execution condition setting

1. Data size
2. Data transceived size within period
3. TCP
4. IM
5. Place designation
6. Time zone designation
7. Data upload/download
8. Specific internet service

O.K.

(a)

(b)

(a)

(b)

(a)

(b)

MOBILE TERMINAL AND METHOD OF CONTROLLING DATA TRANSMISSION AND RECEPTION THEREIN

Pursuant to 35 U.S.C. §119(a), this application claims the benefit of earlier filing date and right of priority to Korean Application No. 10-2009-0034543, filed on Apr. 21, 2009, the contents of which are hereby incorporated by reference herein in their entirety.

BACKGROUND OF THE INVENTION

1. Field of the Invention

The present invention relates to a mobile terminal, and more particularly, to a mobile terminal and method of controlling data transmission and reception therein. Although the present invention is suitable for a wide scope of applications, it is particularly suitable for performing a data transceiving operation or a call signal transceiving operation selectively.

2. Discussion of the Related Art

A terminal is a device which may be configured to perform various functions. Examples of such functions include data and voice communications, capturing images and video via a camera, recording audio, playing music files via a speaker system, and displaying images and video on a display. Some terminals include additional functionality which supports game playing, while other terminals are configured as multimedia players. More recently, terminals have been configured to receive broadcast and multicast signals which permit viewing of content such as videos and television programs.

Efforts are ongoing to support and increase the functionality of terminals. Such efforts include software and hardware improvements, as well as changes and improvements in the structural components which form the terminal.

Generally, a terminal supported by the communication system CDMA Rev. A is unable to simultaneously perform both a call signal transceiving operation and a data transceiving operation but is able to exclusively perform either the call signal transceiving operation or the data transceiving operation.

Specifically, when a mode for performing a call signal transceiving operation or a data transceiving operation selectively (hereinafter, this mode is named 'hybrid mode') is set, if a call signal is received or transmitted in the course of performing the data transceiving operation, the ongoing data transceiving operation is ended and the call signal transceiving operation is then performed.

According to the above described related art, in case that a call signal is transmitted/received in the course of performing a data transceiving operation in hybrid mode, stability of the data transceiving operation is interrupted by the call signal transmission/reception.

Therefore, the demand for a method of performing a data transceiving operation stably in hybrid mode is urgently rising.

SUMMARY OF THE INVENTION

Accordingly, the present invention is directed to a mobile terminal and method of controlling data transmission and reception therein that substantially obviate one or more problems due to limitations and disadvantages of the related art.

An object of the present invention is to provide a mobile terminal and method of controlling data transmission and reception therein, by which a data transceiving operation can be performed prior to a call signal transceiving operation despite that a hybrid mode is set.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal, which selectively performs a data transceiving operation or a signal transceiving operation, according to the present invention includes a wireless communication unit configured to perform the data transceiving operation and a control unit configured to set up a data prior mode for enabling the data transceiving operation to be performed prior to the call signal transceiving operation if the data transceiving operation in the course of being performed by the wireless communication unit meets a prior execution condition.

In this case, as the data prior mode is set up by the control unit, if the call signal transceiving operation is detected, the wireless communication unit preferentially performs the data transceiving operation.

In another aspect of the present invention, a method of controlling data transmission and reception in a mobile terminal, which selectively performs a data transceiving operation or a signal transceiving operation, includes the steps of performing the data transceiving operation, determining whether the data transceiving operation in the course of being performed meets a prior execution condition, and if the data transceiving operation in the course of being performed by the wireless communication unit meets the prior execution condition, setting up a data prior mode for enabling the data transceiving operation to be performed prior to the call signal transceiving operation, In this case, as the data prior mode is set up, if the call signal transceiving operation is detected, the performing step preferentially performs the data transceiving operation.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 6 to FIG. 7E are diagrams of screen configurations for setting a prior execution condition according to one embodiment of the present invention;

DETAILED DESCRIPTION OF THE INVENTION

Reference will now be made in detail to the preferred embodiments of the present invention, examples of which are illustrated in the accompanying drawings. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or like parts.

The suffixes 'module' and 'unit' for the elements used in the following description are given or used in common by considering facilitation in writing this disclosure only but fail to have meanings or roles discriminated from each other.

First of all, mobile terminals described in this disclosure can include a mobile phone, a smart phone, a laptop computer, a digital broadcast terminal, a PDA (personal digital assistants), a PMP (portable multimedia player), a navigation system and the like.

Except a case applicable to a mobile terminal only, it is apparent to those skilled in the art that the configurations according to an embodiment described in this disclosure is applicable to such a stationary terminal as a digital TV, a desktop computer and the like.

Figure 1:
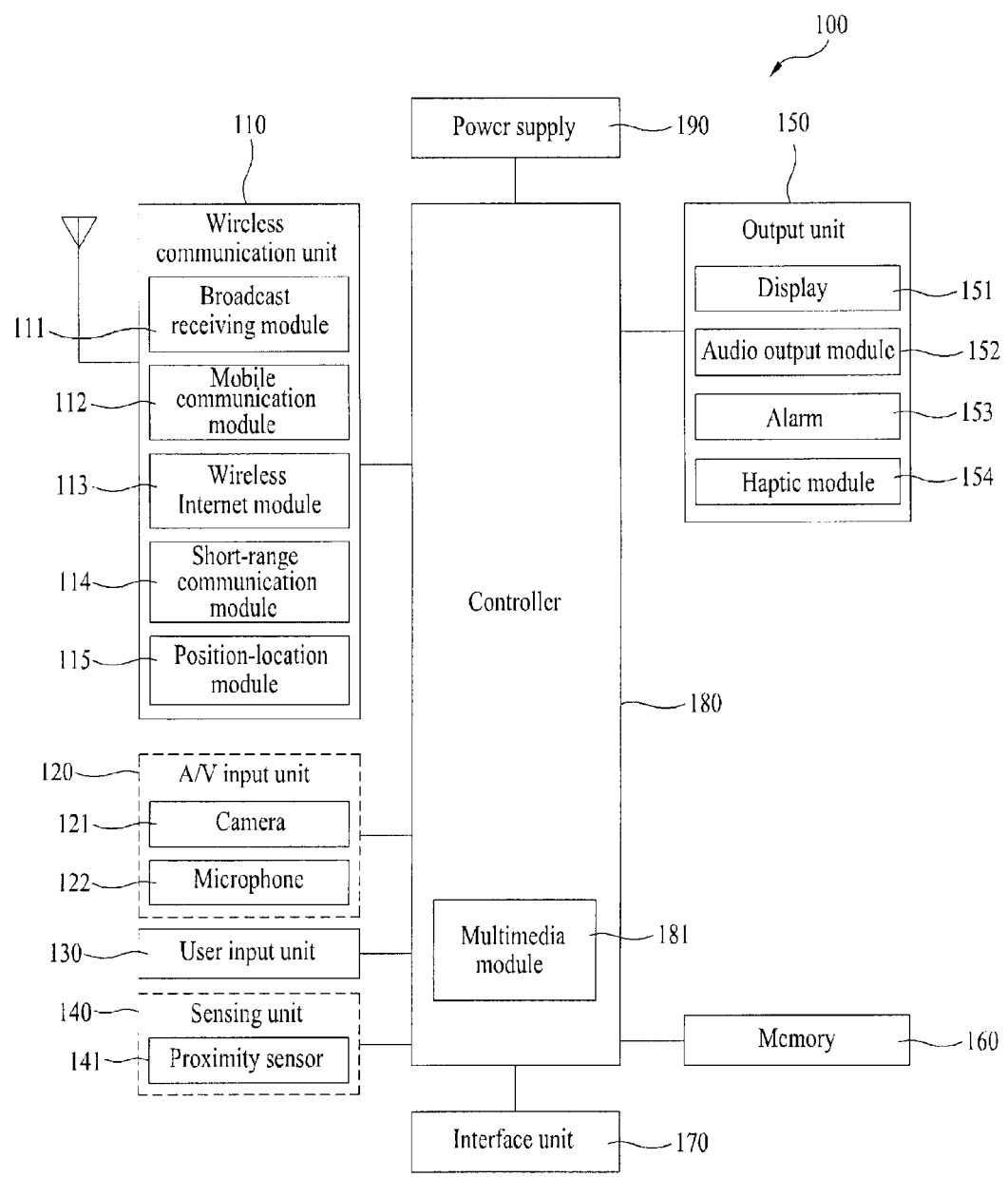
FIG. 1 is a block diagram of a mobile terminal according to one embodiment of the present invention.

FIG. 1 is a block diagram of a mobile terminal according to one embodiment of the present invention.

Referring to FIG. 1, a mobile terminal 100 according to one embodiment of the present invention includes a wireless communication unit 110, an A/V (audio/video) input unit 120, a user input unit 130, a sensing unit 140, an output unit 150, a memory 160, an interface unit 170, a controller (or control unit) 180, a power supply unit 190 and the like. FIG. 1 shows the mobile terminal 100 having various components, but it is understood that implementing all of the illustrated components is not a requirement. Greater or fewer components may alternatively be implemented.

In the following description, the above elements of the mobile terminal 100 are explained in sequence.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel.

The broadcast channel may include a satellite channel and a terrestrial channel.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information includes information associated with a broadcast channel, a broadcast program, a broadcast service provider, etc. And, the broadcast associated information can be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.). Such wireless signals may represent audio, video, and data according to text/multimedia message transceivings, among others.

The wireless internet module 113 supports Internet access for the mobile terminal 100. This module may be internally or externally coupled to the mobile terminal 100. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), etc.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module.

Referring to FIG. 1, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. And, the processed image frames can be displayed on the display unit 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, a jog switch, etc.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100. As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. And, the sensing unit 140 can include a proximity sensor 141.

The output unit 150 generates outputs relevant to the senses of sight, hearing, touch and the like. And, the output unit 150 includes the display unit 151, an audio output module 152, an alarm unit 153, a haptic module 154, a projector module 155 and the like.

The display unit 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display unit 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittive type, which can be named a transparent display. As a representative example for the transparent display, there is TOLED (transparent OLED) or the like. A rear configuration of the display unit 151 can be implemented in the optical transmittive type as well. In this configuration, a user is able to see an object in rear of a terminal body via the area occupied by the display unit 151 of the terminal body.

At least two display units 151 can be provided to the mobile terminal 100 in accordance with the implemented configuration of the mobile terminal 100. For instance, a plurality of display units can be arranged on a single face of the mobile terminal 100 in a manner of being spaced apart from each other or being built in one body. Alternatively, a plurality of display units can be arranged on different faces of the mobile terminal 100.

In case that the display unit 151 and a sensor for detecting a touch action (hereinafter called 'touch sensor') configures a mutual layer structure (hereinafter called 'touchscreen'), it is able to use the display unit 151 as an input device as well as an output device. In this case, the touch sensor can be configured as a touch film, a touch sheet, a touchpad or the like.

The touch sensor can be configured to convert a pressure applied to a specific portion of the display unit 151 or a variation of a capacitance generated from a specific portion of the display unit 151 to an electric input signal. Moreover, it is able to configure the touch sensor to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 is able to know whether a prescribed portion of the display unit 151 is touched.

Referring to FIG. 1, a proximity sensor (not shown in the drawing) can be provided to an internal area of the mobile terminal 100 enclosed by the touchscreen or around the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. In case that the touchscreen includes the electrostatic capacity proximity sensor, it is configured to detect the proximity of a pointer using a variation of electric field according to the proximity of the pointer. In this case, the touchscreen (touch sensor) can be classified as the proximity sensor.

In the following description, for clarity, an action that a pointer approaches without contacting with the touchscreen to be recognized as located on the touchscreen is named 'proximity touch'. And, an action that a pointer actually touches the touchscreen is named 'contact touch'. The meaning of the position on the touchscreen proximity-touched by the pointer means the position of the pointer which vertically opposes the touchscreen when the pointer performs the proximity touch.

The proximity sensor detects a proximity touch and a proximity touch pattern (e.g., a proximity touch distance, a proximity touch duration, a proximity touch position, a proximity touch shift state, etc.). And, information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be outputted via the display unit 151 or the audio output unit 152. Hence, the display unit 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be outputted in a manner of being synthesized together or can be outputted in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The projector module 155 is the element for performing an image projector function using the mobile terminal 100. And, the projector module 155 is able to display an image, which is identical to or partially different at least from the image displayed on the display unit 151, on an external screen or wall according to a control signal of the controller 180.

In particular, the projector module 155 can include a light source (not shown in the drawing) generating light (e.g., laser) for projecting an image externally, an image producing means (not shown in the drawing) for producing an image to output externally using the light generated from the light source, and a lens (not shown in the drawing) for enlarging to output the image externally in a predetermined focus distance. And, the projector module 155 can further include a device (not shown in the drawing) for adjusting an image projected direction by mechanically moving the lens or the whole module.

The projector module 155 can be classified into a CRT (cathode ray tube) module, an LCD (liquid crystal display) module, a DLP (digital light processing) module or the like according to a device type of a display means. In particular, the DLP module is operated by the mechanism of enabling the light generated from the light source to reflect on a DMD (digital micro-mirror device) chip and can be advantageous for the downsizing of the projector module 151.

Preferably, the projector module 155 can be provided in a length direction of a lateral, front or backside direction of the mobile terminal 100. And, it is understood that the projector module 155 can be provided to any portion of the mobile terminal 100 according to the necessity thereof.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures, moving pictures, etc. And, a recent use history or a cumulative use frequency of each data (e.g., use frequency for each phonebook, each message or each multimedia) can be stored in the memory unit 160. Moreover, data for various patterns of vibration and/or sound outputted in case of a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. And, the mobile terminal 100 is able to operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

When the mobile terminal 110 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The controller (or control unit) 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 is able to perform a pattern recognizing process for recognizing a writing input and a picture drawing input carried out on the touchscreen as characters or images, respectively.

The power supply unit 190 provides power required by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

Figure 2A:
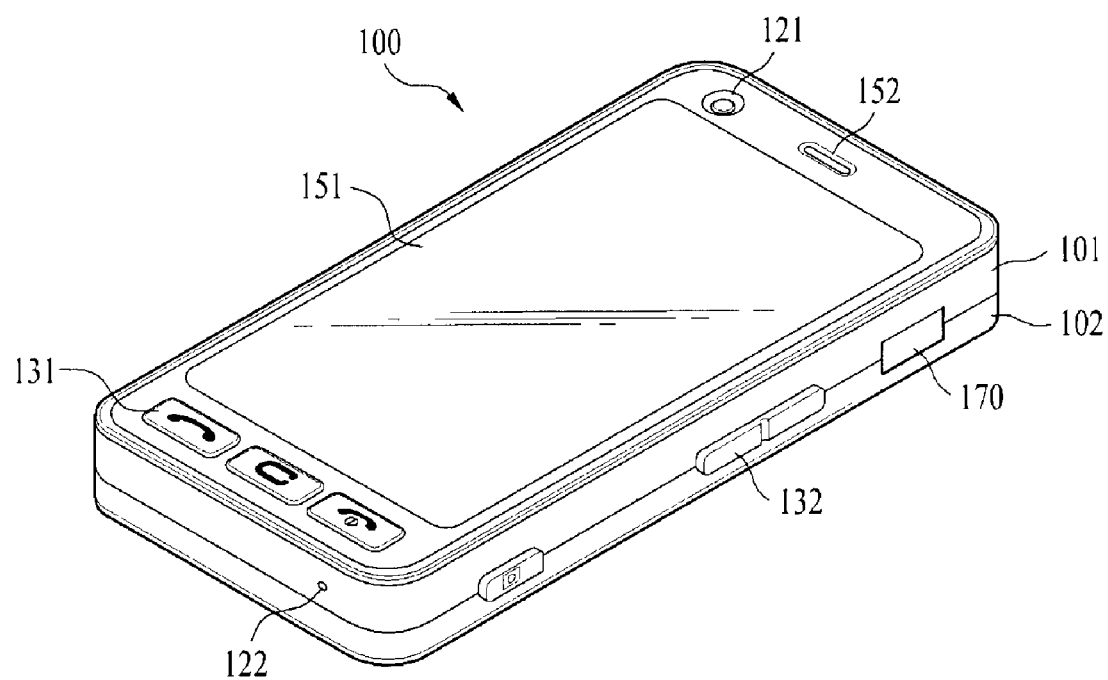
FIG. 2A is a front perspective diagram of a mobile terminal according to one embodiment of the present invention.

FIG. 2A is a front perspective diagram of a mobile terminal according to one embodiment of the present invention.

The mobile terminal 100 shown in the drawing has a bar type terminal body. Yet, the mobile terminal 100 may be implemented in a variety of different configurations. Examples of such configurations include folder-type, slide-type, rotational-type, swing-type and combinations thereof. For clarity, further disclosure will primarily relate to a bar-type mobile terminal 100. However such teachings apply equally to other types of mobile terminals.

Referring to FIG. 2A, the mobile terminal 100 includes a case (casing, housing, cover, etc.) configuring an exterior thereof. In the present embodiment, the case can be divided into a front case 101 and a rear case 102. Various electric/electronic parts are loaded in a space provided between the front and rear cases 101 and 102. Optionally, at least one middle case can be further provided between the front and rear cases 101 and 102 in addition.

The cases 101 and 102 are formed by injection molding of synthetic resin or can be formed of metal substance such as stainless steel (STS), titanium (Ti) or the like for example.

A display unit 151, an audio output unit 152, a camera 121, user input units 130/131 and 132, a microphone 122, an interface 180 and the like can be provided to the terminal body, and more particularly, to the front case 101.

The display unit 151 occupies most of a main face of the front case 101. The audio output unit 151 and the camera 121 are provided to an area adjacent to one of both end portions of the display unit 151, while the user input unit 131 and the microphone 122 are provided to another area adjacent to the other end portion of the display unit 151. The user input unit 132 and the interface 170 can be provided to lateral sides of the front and rear cases 101 and 102.

The input unit 130 is manipulated to receive a command for controlling an operation of the terminal 100. And, the input unit 130 is able to include a plurality of manipulating units 131 and 132. The manipulating units 131 and 132 can be named a manipulating portion and may adopt any mechanism of a tactile manner that enables a user to perform a manipulation action by experiencing a tactile feeling.

Content inputted by the first or second manipulating unit 131 or 132 can be diversely set. For instance, such a command as start, end, scroll and the like is inputted to the first manipulating unit 131. And, a command for a volume adjustment of sound outputted from the audio output unit 152, a command for a switching to a touch recognizing mode of the display unit 151 or the like can be inputted to the second manipulating unit 132.

Figure 2B:
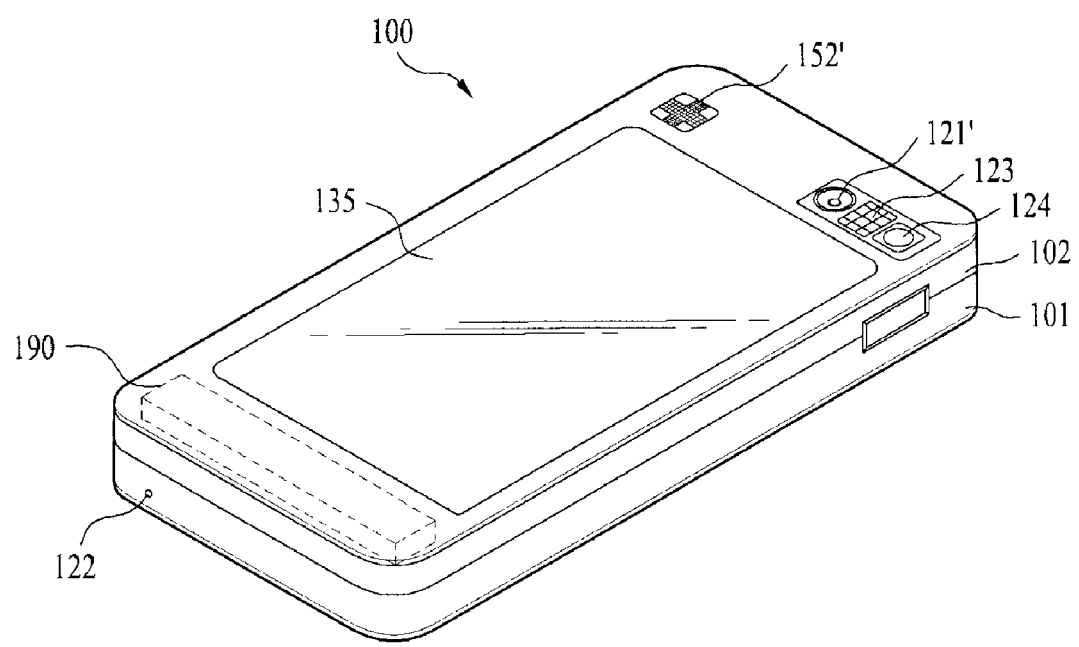
FIG. 2B is a rear perspective diagram of a mobile terminal according to one embodiment of the present invention.

FIG. 2B is a perspective diagram of a backside of the terminal shown in FIG. 2A.

Referring to FIG. 2B, a camera 121' can be additionally provided to a backside of the terminal body, and more particularly, to the rear case 102. The camera 121 has a photographing direction that is substantially opposite to that of the former camera 121 shown in FIG. 21A and may have pixels differing from those of the firmer camera 121.

Preferably, for instance, the former camera 121 has low pixels enough to capture and transmit a picture of user's face for a video call, while the latter camera 121' has high pixels for capturing a general subject for photography without transmitting the captured subject. And, each of the cameras 121 and 121' can be installed at the terminal body to be rotated or popped up.

A flash 123 and a mirror 124 are additionally provided adjacent to the camera 121'. The flash 123 projects light toward a subject in case of photographing the subject using the camera 121'. In case that a user attempts to take a picture of the user (self-photography) using the camera 121', the mirror 124 enables the user to view user's face reflected by the mirror 124.

An additional audio output unit 152' can be provided to the backside of the terminal body. The additional audio output unit 152' is able to implement a stereo function together with the former audio output unit 152 shown in FIG. 2A and may be used for implementation of a speakerphone mode in talking over the terminal.

A broadcast signal receiving antenna 124 can be additionally provided to the lateral side of the terminal body as well as an antenna for communication or the like. The antenna 124 constructing a portion of the broadcast receiving module 111 shown in FIG. 1 can be retractably provided to the terminal body.

A power supply unit 190 for supplying a power to the terminal 100 is provided to the terminal body. And, the power supply unit 190 can be configured to be built within the terminal body. Alternatively, the power supply unit 190 can be configured to be detachably connected to the terminal body.

A touchpad 135 for detecting a touch can be additionally provided to the rear case 102. The touchpad 135 can be configured in a light transmittive type like the display unit 151. In this case, if the display unit 151 is configured to output visual information from its both faces, it is able to recognize the visual information via the touchpad 135 as well. The information outputted from both of the faces can be entirely controlled by the touchpad 135. Alternatively, a display is further provided to the touchpad 135 so that a touchscreen can be provided to the rear case 102 as well.

The touchpad 135 is activated by interconnecting with the display unit 151 of the front case 101. The touchpad 135 can be provided in rear of the display unit 151 in parallel. The touchpad 135 can have a size equal to or smaller than that of the display unit 151. The proximity sensor 141 described with reference to FIG. 1 is explained in detail with reference to FIG. 4 as follows.

Figure 3:
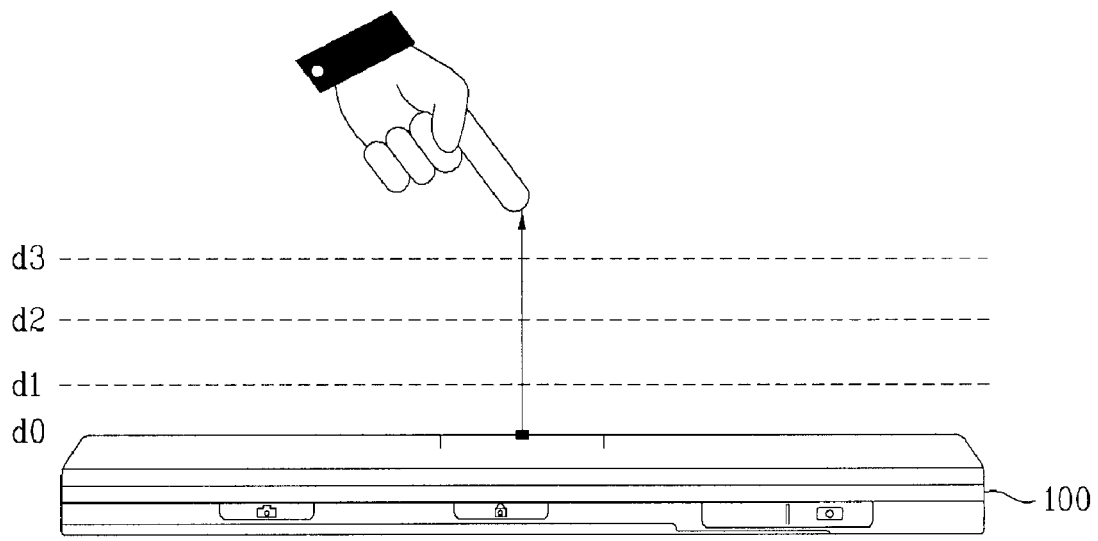
FIG. 3 is a diagram to explain the concept of proximity depth of a proximity sensor.

FIG. 3 is a conceptional diagram for explaining a proximity depth of a proximity sensor.

Referring to FIG. 3, when such a pointer as a user's finger, a pen and the like approaches the touchscreen, a proximity sensor 141 provided within or in the vicinity of the touchscreen detects the approach of the pointer and then outputs a proximity signal.

The proximity sensor 141 can be configured to output a different proximity signal according to a distance between the pointer and the proximity-touched touchscreen (hereinafter named 'proximity depth').

In FIG. 3, exemplarily shown is a cross-section of the touchscreen provided with a proximity sensor capable to three proximity depths for example. And, it is understood that a proximity sensor capable of proximity depths amounting to the number smaller than 3 or equal to or greater than 4 is possible.

In detail, in case that the pointer is fully contacted with the touchscreen (d0), it is recognized as a contact touch. In case that the pointer is located to be spaced apart from the touchscreen in a distance smaller than d1, it is recognized as a proximity touch to a first proximity depth. In case that the pointer is located to be spaced apart from the touchscreen in a distance between d1 and d2, it is recognized as a proximity touch to a second proximity depth. In case that the pointer is located to be spaced apart from the touchscreen in a distance smaller than d3 or equal to or greater than d2, it is recognized as a proximity touch to a third proximity depth. In case that the pointer is located to be spaced apart from the touchscreen in a distance equal to or greater than d3, it is recognized as a proximity touch is released.

Hence, the controller 180 is able to recognize the proximity touch as one of various input signals according to the proximity depth and position of the pointer. And, the controller 180 is able to perform various operation controls according to the various input signals.

Figure 4A:
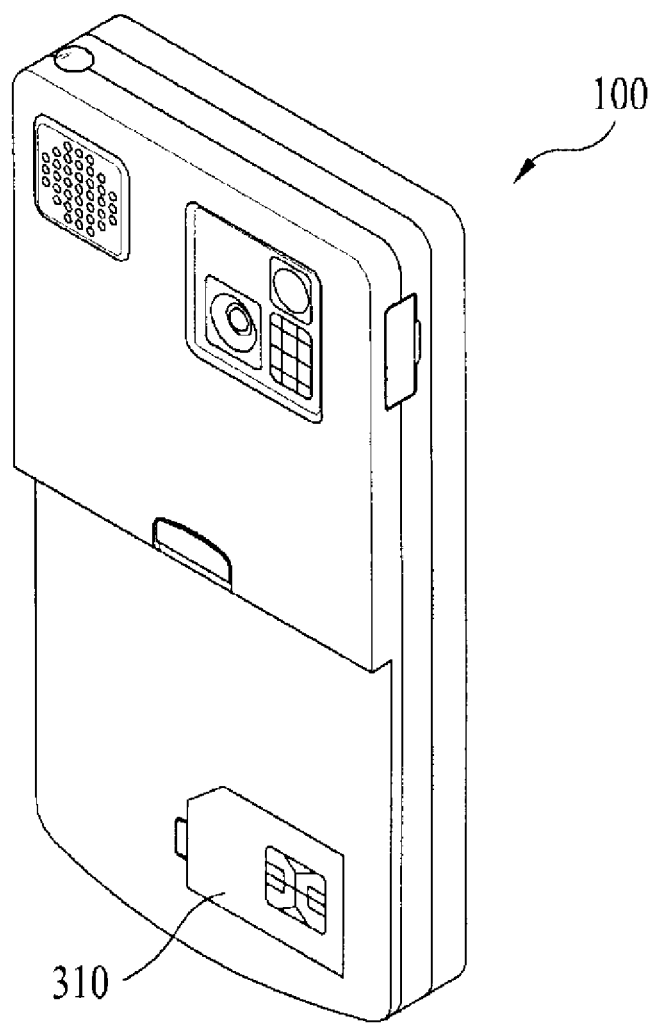
FIG. 4A and FIG. 4B are diagrams of a rear perspective view of a mobile terminal according to one embodiment of the present invention, in which an identity device detachably provided to the mobile terminal.
Figure 4B:
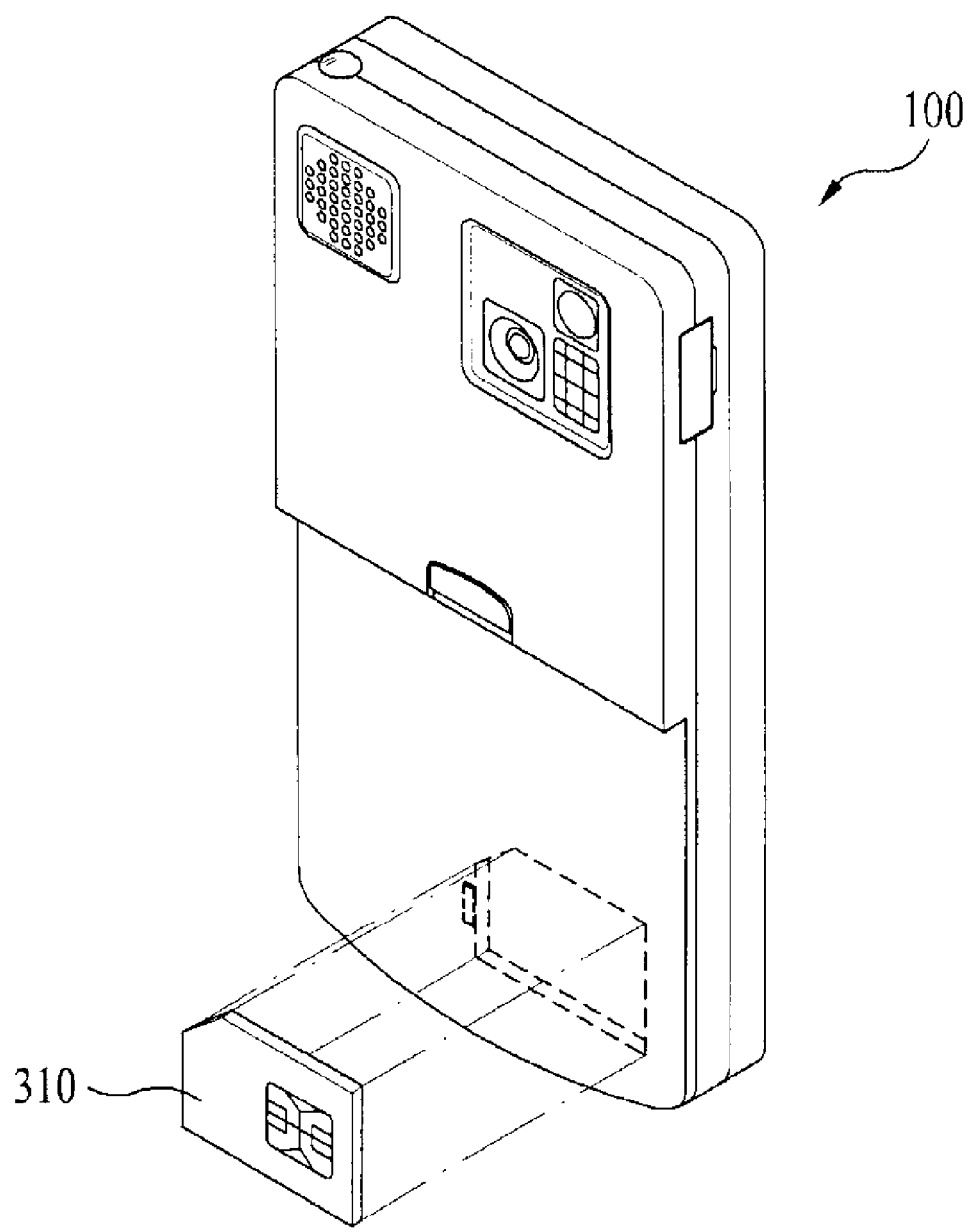

FIG. 4A and FIG. 4B are backside perspective diagrams of a mobile terminal according to one embodiment of the present invention, in which an identity device is detached/attached to/from the mobile terminal. In this case the identity device can include a SIM card for example.

Referring to FIG. 4A and FIG. 4B, an identity device 310 is provided detachable from the terminal 100. Therefore, an old identity device can be replaced by a new identity device to be loaded in the terminal 100. Of course, the identity device 310 can be loaded in the terminal 100 by being combined with the interface unit 170. Alternatively, the identity device 310 can be loaded in the terminal 100 by being connected to a connector separately provided for the assembly to the identity device 310.

And, a connecting means (not shown in the drawing) for connecting the identity device 10 to the terminal 100 can be provided to any place of the terminal such as a backside, a lateral side, a front side and the like.

For clarity and convenience of explanation, assume that a mobile terminal mentioned in the following description includes at least one of the elements shown in FIG. 1.

A mobile terminal according to the present invention is able to perform at least one of a call signal transceiving operation and a data transceiving operation.

In particular, the mobile terminal 100 exclusively performs a call signal transceiving operation prior to a data transceiving operation (if a call signal prior mode is set), exclusively performs a data transceiving operation prior to a call signal transceiving operation (if a data prior mode is set), or is able to selectively perform a call signal transceiving operation or a data transceiving operation according to a situation (if a hybrid mode is set), under the control of the controller 180.

For instance, if a call signal prior mode is set, the mobile terminal 100 performs a call signal transceiving operation only without performing a data transceiving operation under the control of the controller 180. If a data prior mode is set, the mobile terminal 100 performs a data transceiving operation only without performing a call signal transceiving operation under the control of the controller 180. If a hybrid mode is set, the mobile terminal 100 is able to selectively perform a call signal transceiving operation or a data transceiving operation according to a situation under the control of the controller 180.

Specifically, in case that a communication system is the CDMA Rev. A, the mobile terminal 100 is able to perform a call signal transceiving operation (e.g., 1x voice call) or a data transceiving operation (e.g., 1x EVDO data) by the above described method. Moreover, while a hybrid mode is set, if a call signal transceiving operation takes place in the course of performing a data transceiving operation, the mobile terminal 100 stops (or terminates) the data transceiving operation and then executes the call signal transceiving operation.

While a hybrid mode is set, if a call signal transceiving operation takes place in the course of a data transceiving operation, a data transceiving controlling method for performing the data transceiving operation shall be explained in this disclosure.

In the following description, a method of controlling data transmission and reception in a mobile terminal according to the present invention is explained with reference to FIG. 5.

Figure 5:
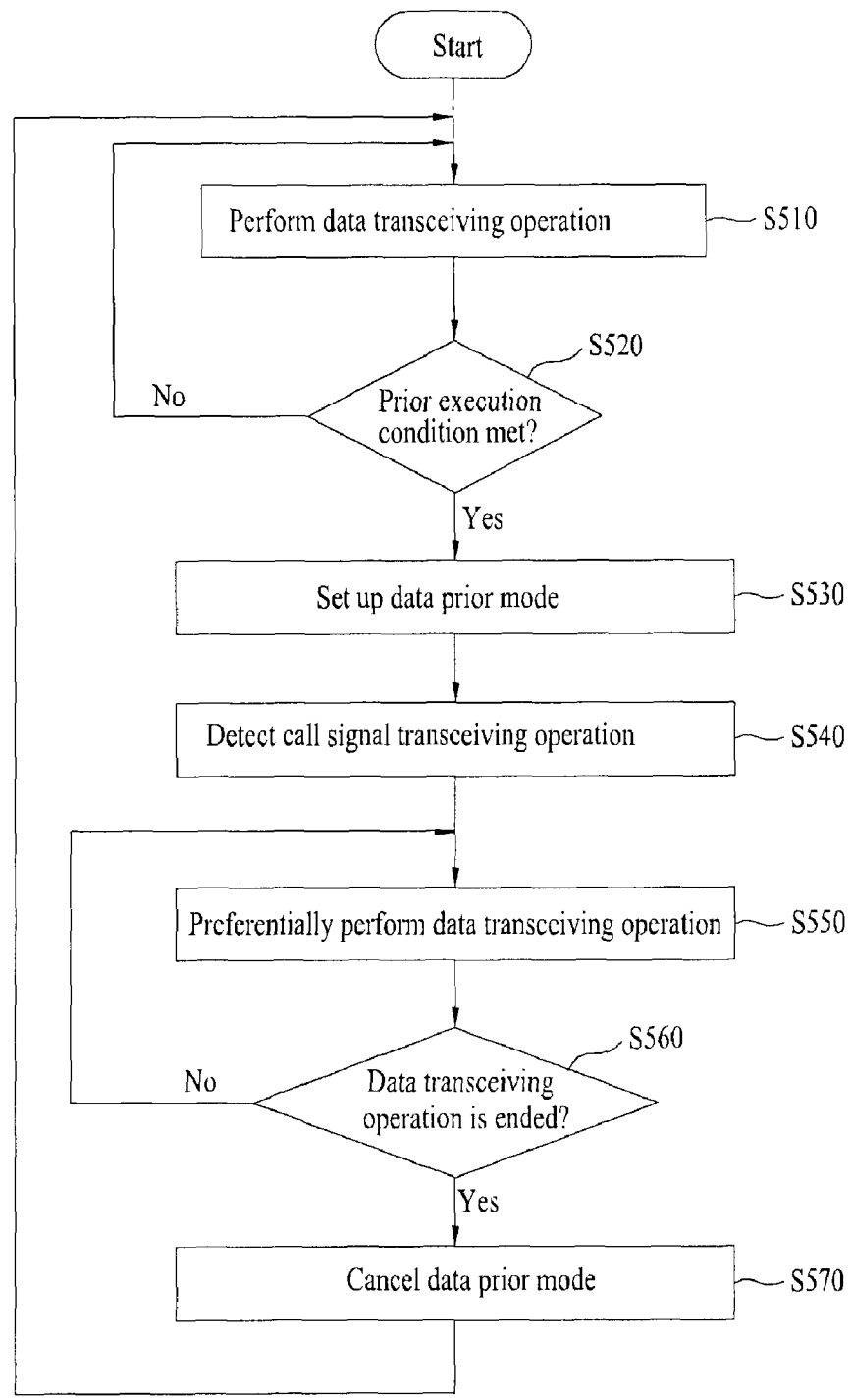
FIG. 5 is a flowchart for a method of controlling data transmission and reception in a mobile terminal according to one embodiment of the present invention.

FIG. 5 is a flowchart for a method of controlling data transmission and reception in a mobile terminal according to one embodiment of the present invention.

Referring to FIG. 5, the mobile terminal 100 performs a data transceiving operation with an external server (or an external terminal) via the wireless communication unit 110 under the control of the controller 180 [S510].

In the data transceiving operation performing step S510, the mobile terminal 100 performs the data transceiving operation according to a hybrid mode.

For instance, a data transceiving operation means a data transmission and reception with an external server or an external terminal. And, the data transceiving operation can be performed on a file (e.g., audio file, video file, text file, multimedia file, etc.) transmission and reception (upload and download included), an internet supported service (e.g., internet banking, email, IPTV, etc.), a data (e.g., conversation, status information, buddy addition/deletion, nickname change, etc.) transmission and reception according to an instant messaging service execution, a video call and the like.

The mobile terminal 100 determines whether the data transceiving operation performed in the data transceiving operation performing step S510 meets a prior execution condition under the control of the controller 180 [S520].

The determining step S520 can be initiated at a timing point of starting a data transceiving operation, a random timing point in the course of the data transceiving operation or a timing point according to a predetermined period in the course of the data transceiving operation.

In this case, the prior execution condition may mean a condition for performing the data transceiving operation with priority even if a call signal transceiving operation takes place in the course of the data transceiving operation in the hybrid mode.

For instance, the prior execution condition can include at least one of a data size, a data transceived size for a predetermined period of time, a presence or non-presence of a data transmission and reception by a transmission control protocol (TCP), a presence or non-presence of a data transmission and reception by an instant messaging service (IMS), a presence or non-presence at a specific place, a presence or non-presence of belonging to a specific time zone, a presence or non-presence of a data upload/download over a predetermined time, a presence or non-presence of a specific service via internet, and the like.

A process for setting a prior execution condition is explained with reference to the accompanying drawings as follows.

First of all, the mobile terminal 100 receives an input of a user operation corresponding to a prior execution condition via the user input unit 130 and is then able to set up a prior execution condition corresponding to the user operation under the control of the controller 180.

In this case, the prior execution condition can be set up before or in the course of a data transceiving process.

Figure 7A:
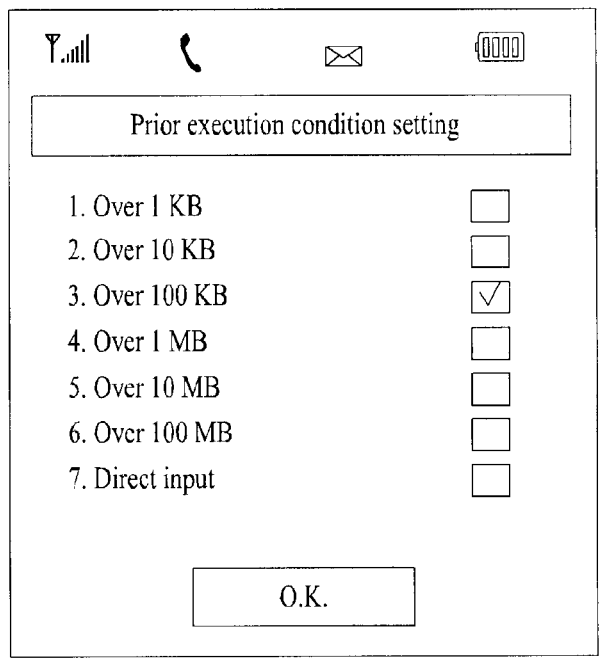
Figure 7A:
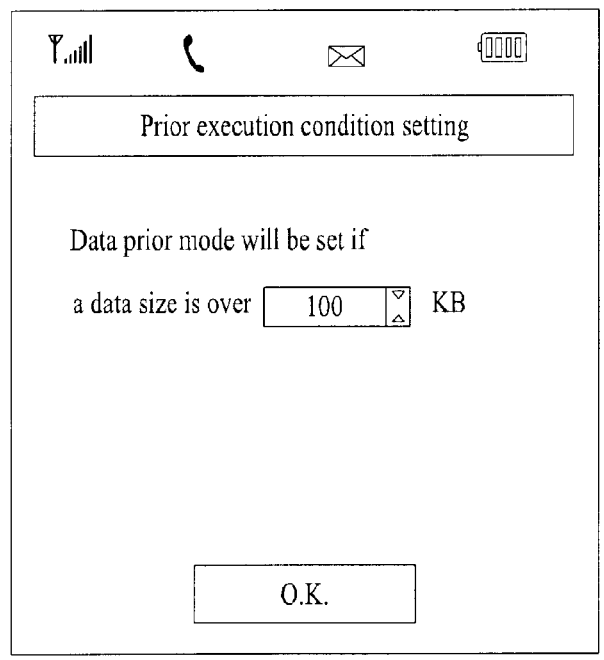
Figure 7B:
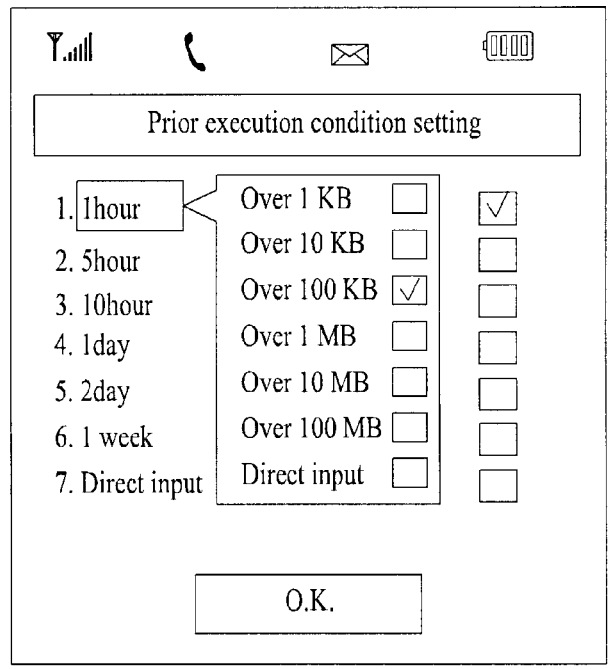
Figure 7B:
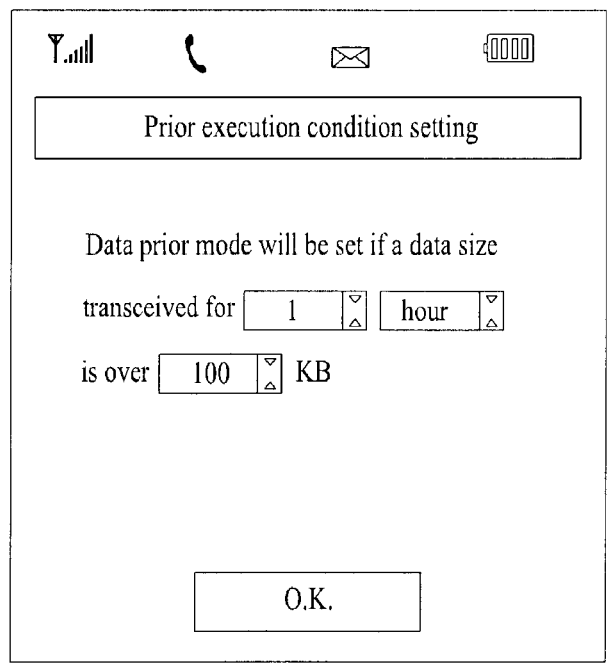
Figure 7C:
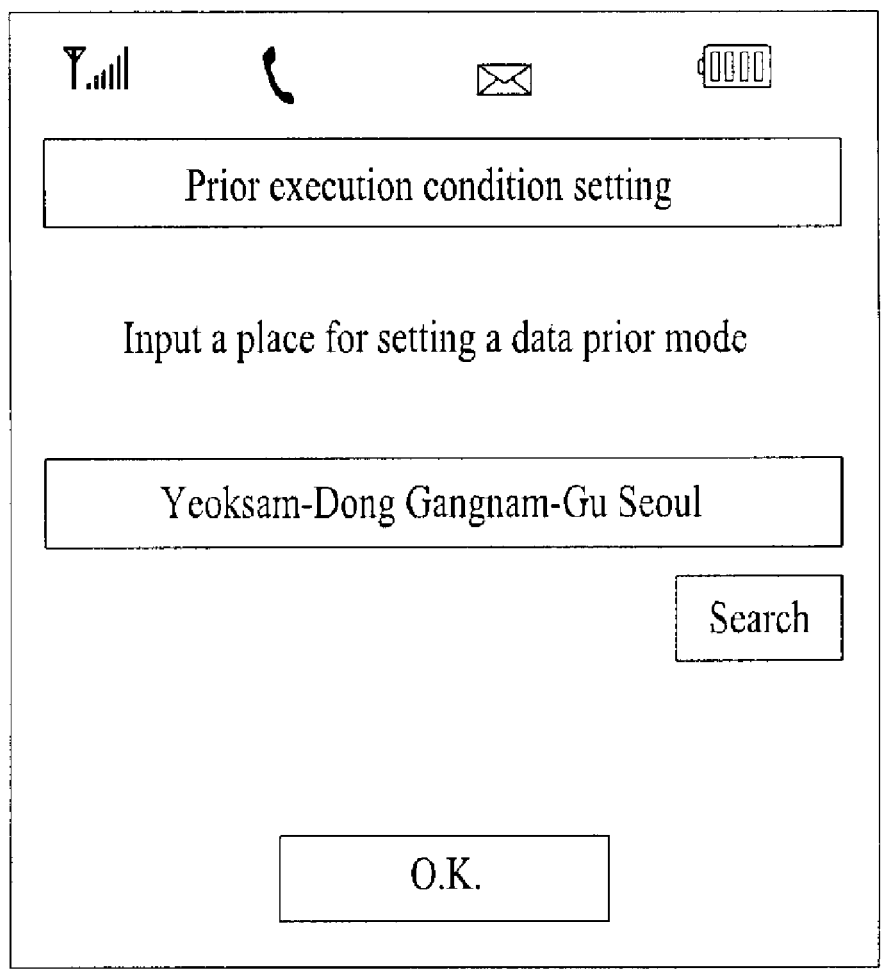
Figure 7D:
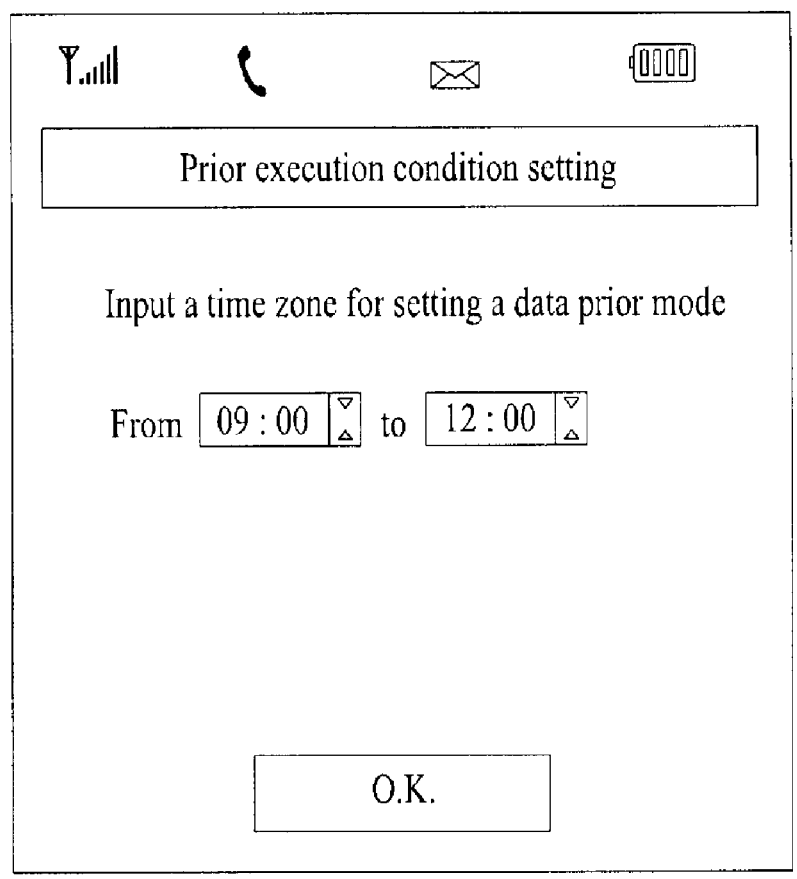
Figure 7E:
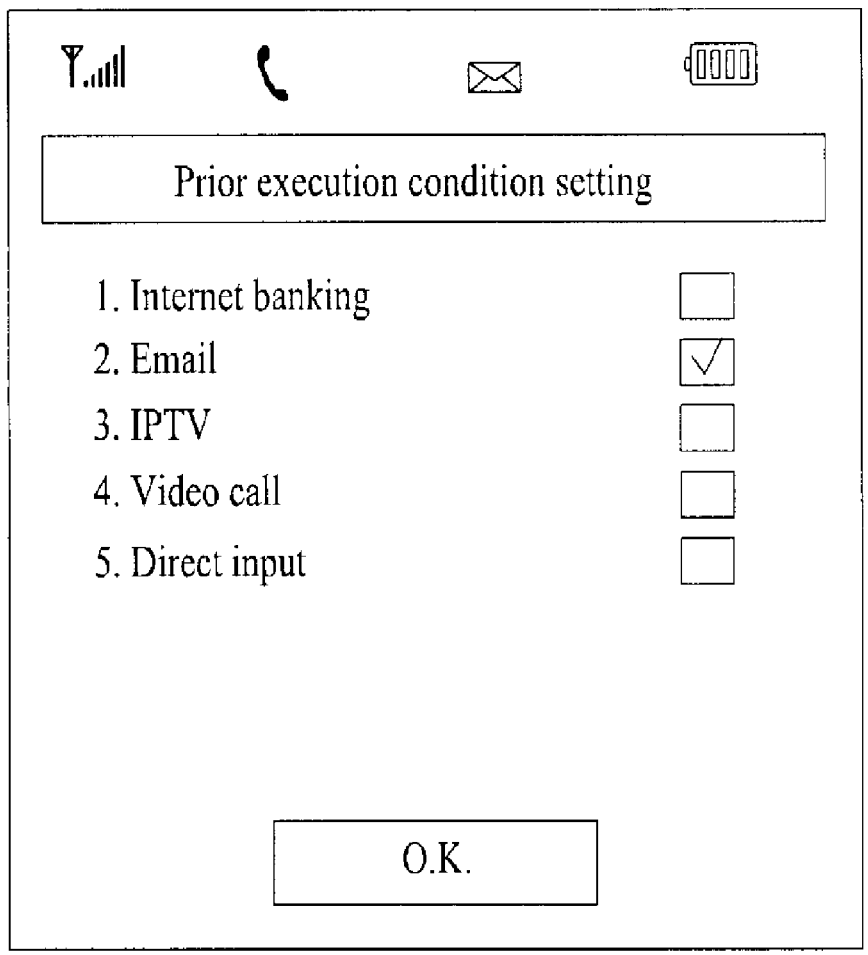

FIG. 6 and FIG. 7E are diagrams of screen configurations for setting a prior execution condition according to one embodiment of the present invention.

Referring to FIG. 6, if a ser selects a menu item corresponding to a prior execution condition via a menu search, the mobile terminal 100 is able to display a list constructed with settable prior execution conditions on a screen.

If a data size is selected from the list shown in FIG. 6, the mobile terminal 100 is able to set a data prior mode in case of transceiving data over a predetermined size (e.g., 100 KB), according to a selection made by a user [FIG. 7A]. In this case, the user is able to select a data size, which is to be set to a prior execution condition, from a data size list [(a) of FIG. 7A] or directly input a data size [(b) of FIG. 7A].

Alternatively, once a data transceived size within a period of time is selected from the list shown in FIG. 6, the mobile terminal 100 is able to specify that a data prior mode shall be set if a data size transceived for a predetermined period of time (e.g., 1 hour) is equal to or greater than a predetermined size (e.g., 100 KB), according to a selection made by the user [FIG. 7B]. In this case, the user is able to select a per-period data size, which is to be set to a prior execution condition, from a data size list [(a) of FIG. 7B] or directly input a data size [(b) of FIG. 7B].

Alternatively, once a place designation is selected from the list shown in FIG. 6, the mobile terminal is able to specify that a data prior mode will be set if it is located at a specific place (e.g., Yeoksam-Dong, Gangnam-Gu, Seoul), according to a selection made by the user [FIG. 7C]. In this case, the user is able to directly input a specific place, which is to be set to a prior execution condition, or search address information stored in the mobile terminal 100 for a specific place.

Alternatively, once a time zone specification is selected from the list shown in FIG. 6, the mobile terminal 100 is able to specify that a data prior mode will be set if it belongs to a specific time zone (e.g., 09:00 to 12:00), according to a selection made by the user [FIG. 7D]. In this case, the user is able to directly input a specific time zone, which is to be set to a prior execution condition, or select a specific time zone from a time zone list.

Alternatively, once a specific internet service is selected from the list shown in FIG. 6, the mobile terminal 100 is able to specify that a data prior mode will be set if a specific internet service (e.g., email) is performed, according to a selection made by the user [FIG. 7E]. In this case, the user is able to select a specific internet service, which is to be set to a prior execution condition, or directly input a specific internet service.

Meanwhile, once a TCP is selected from the list shown in FIG. 6, the mobile terminal is able to specify that a data prior mode will be set if data is transmitted and received using the TCP [not shown in the drawing]. Once an IM is selected from the list shown in FIG. 6, the mobile terminal 100 is able to specify that a data prior mode will be set if data is transmitted and received using an IMS [not shown in the drawing]. Once a data upload/download is selected from the list shown in FIG. 6, the mobile terminal 100 is able to specify that a data prior mode will be set if a data upload/download is performed with an external terminal for a predetermined period of time to share data with the external terminal [not shown in the drawing].

Of course, the prior execution condition can be set up by a selection made by a user. Alternatively, the prior execution condition can be set up when a terminal is manufactured. Alternatively, the prior execution condition can be randomly set up by the controller 180.

Referring now to FIG. 5, the mobile terminal 100 determines whether the data transceiving operation, which is being performed in the performing step S510, meets the prior execution condition, under the control of the controller 180 [S520].

As a result of the determining step S520, if the prior execution condition is met, the mobile terminal 100 sets the data prior mode under the control of the controller 180 [S530].

In the setting step S530, a data prior mode is set after a previously set hybrid mode has been canceled. Alternatively, in the setting step S530, a data prior mode can be temporarily set by maintaining a previously set hybrid mode basically.

In the former case, the data prior mode keeps being maintained even if the data transceiving operation is ended. In the latter case, if the data transceiving operation is ended, it is able to return to the hybrid mode after the data prior mode has been ended.

In the following description, in case that a prior execution condition is met, a process for setting a data prior mode is explained in detail with reference to the accompanying drawings.

FIGS. 8A to 10C are diagrams of screen configurations for setting a data prior mode according to one embodiment of the present invention if a prior execution condition is met.

Figure 8A:
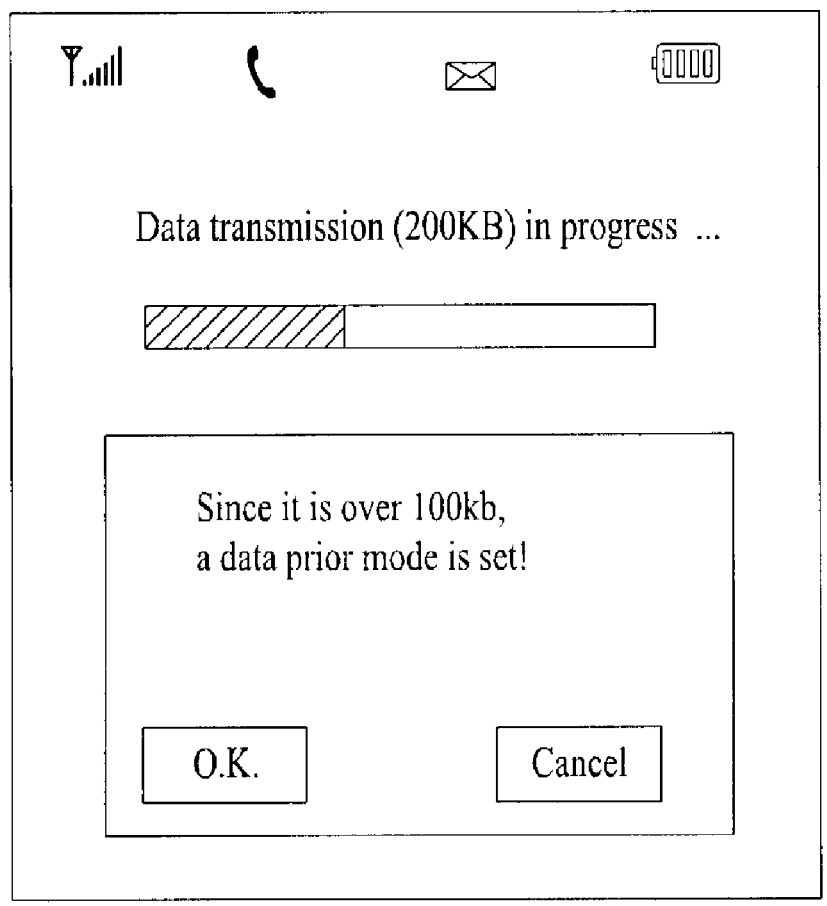
FIGS. 8A to 10C are diagrams of screen configurations for setting a data prior mode according to one embodiment of the present invention if a prior execution condition is met.

Referring to FIG. 8A, if a prior execution condition is set to 'data size over 100 KB' [cf. FIG. 7A] and if a currently transceived data size is 200 KB, since the currently transceived data size is over 100 KB, the mobile terminal 100 sets up a data prior mode and is then able to externally announce that the data prior mode has been set.

Figure 8B:
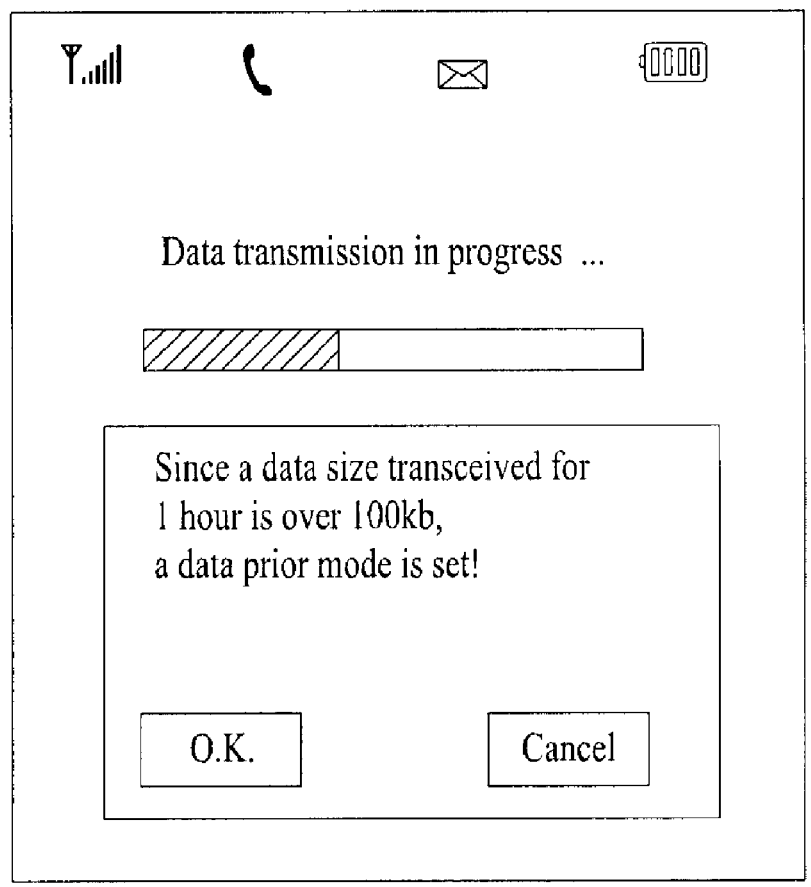

Referring to FIG. 8B, if a prior execution condition is set to 'data transmission/reception over 100 KB for 1 hour' [cf. FIG. 7B] and if a data size transceived until now from 1 hour ago exceed 100 KB, since the data size transceived for 1 hour is over 100 KB, the mobile terminal 100 sets up a data prior mode and is then able to externally announce that the data prior mode has been set.

Figure 8C:
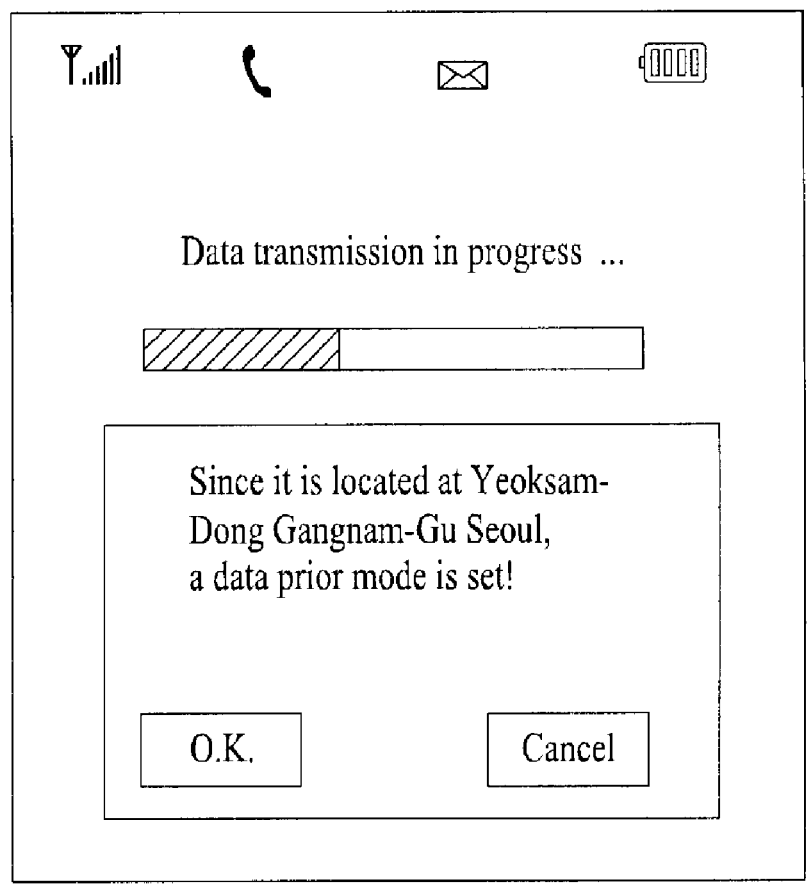

Referring to FIG. 8C, if a prior execution condition is set to 'Yeoksam-Dong, Gangnam-Gu, Seoul' [cf. FIG. 7C] and if a data size transceived until now from 1 hour ago exceed 100 KB, since the mobile terminal 100 is located at 'Yeoksam-Dong', the mobile terminal 100 sets up a data prior mode and is then able to externally announce that the data prior mode has been set.

Figure 8D:
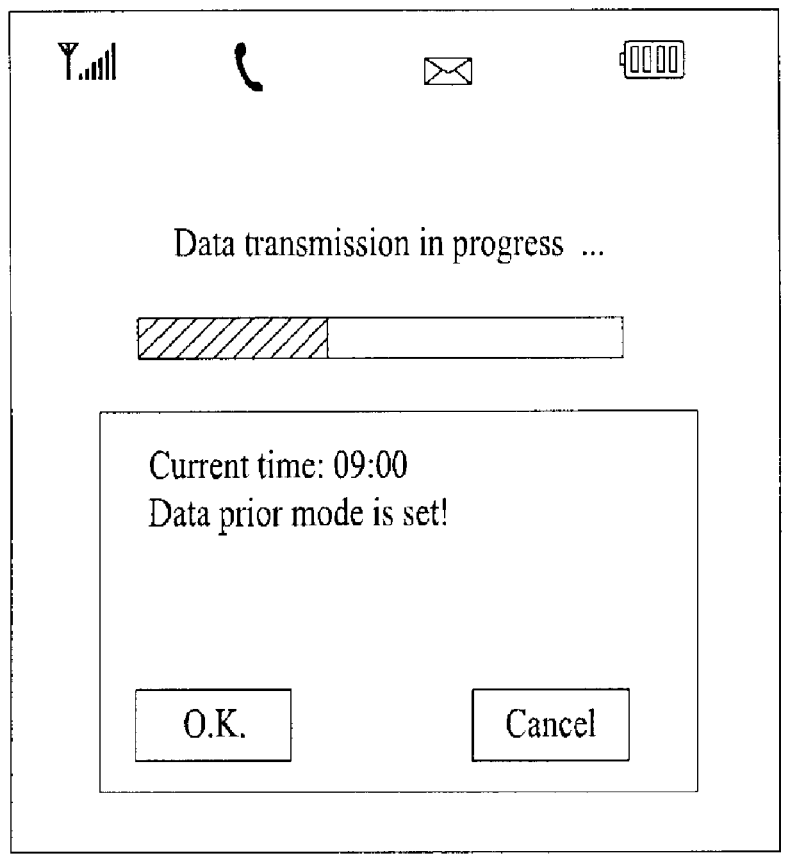

Referring to FIG. 8D, if a prior execution condition is set to '09:00 to 12:00' [cf. FIG. 7D] and if a current time is between 09:00 and 12:00, since the current time belongs to a range between 09:00 and 12:00, the mobile terminal 100 sets up a data prior mode and is then able to externally announce that the data prior mode has been set.

Figure 8E:
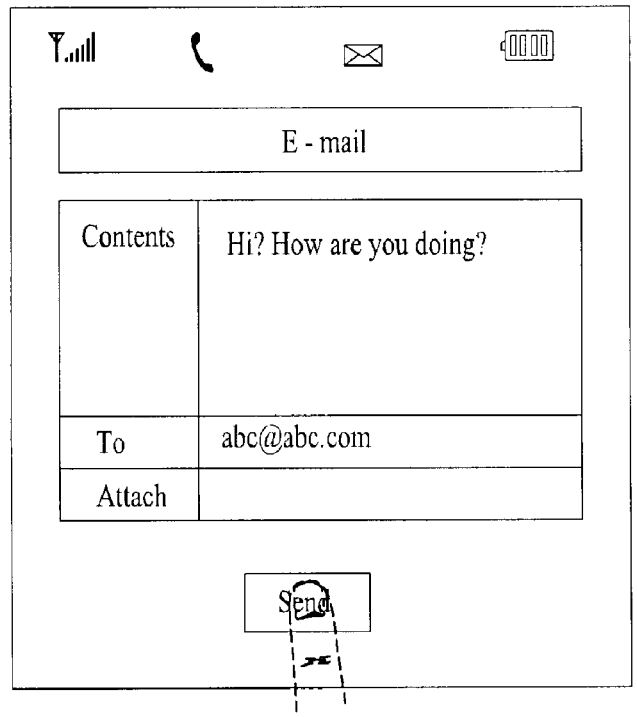
Figure 8E:
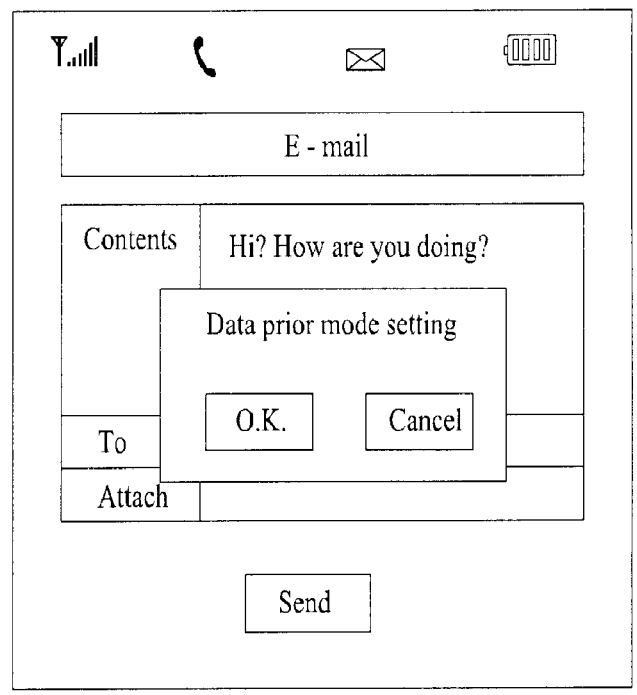

Referring to FIG. 8E, if a prior execution condition is set to 'email' [cf. FIG. 7E] and if an email is being written, since the email is being written, the mobile terminal 100 sets up a data prior mode and is then able to externally announce that the data prior mode has been set.

Moreover, in FIGS. 8A to 8E, a data prior mode cancellation can be selected by a user as soon as the mobile terminal 100 announces that the data prior mode has been set up. If the data prior mode cancellation is selected, the mobile terminal 100 cancels the data prior mode and is then able to return to the hybrid mode.

Figure 9:
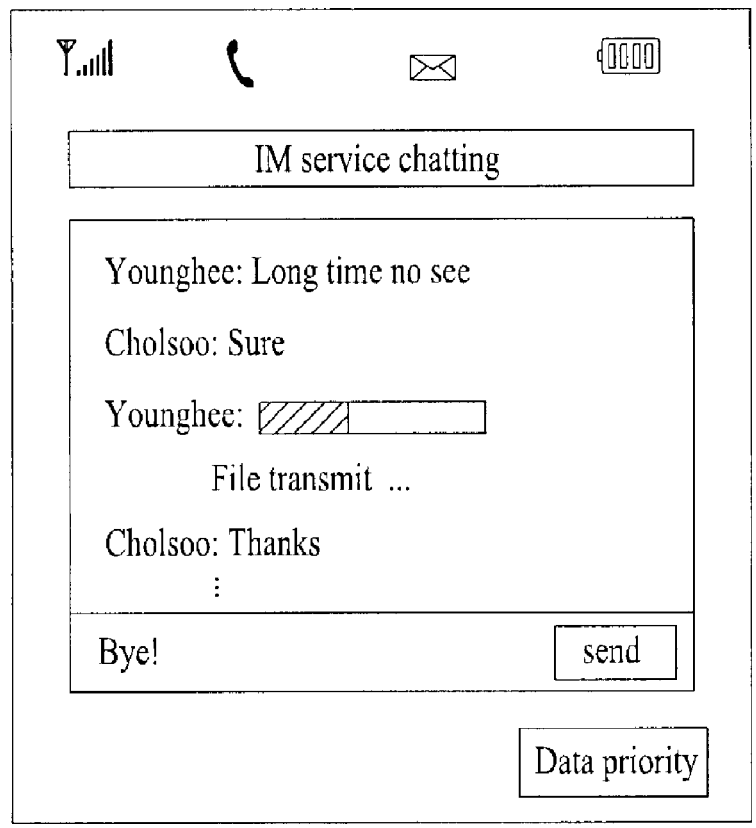

Referring to FIG. 9, if a data transceiving operation according to IMS execution is being performed, the mobile terminal 100 sets up a data prior mode and is then able to externally announce that the data prior mode has been set. For instance, in order to announce the data prior mode setup, the mobile terminal 100 is able to display an icon ('data priority') corresponding to the data prior mode setup on one area of a screen.

For instance, a data transceiving operation according to IMS execution can include a conversation action (text or file transmission/reception included) according to a conversation session setup with a correspondent party, a change of status information (e.g., absence, offline/online, meeting in progress, etc.), buddy addition/deletion, a nickname change or the like.

Figure 10A:
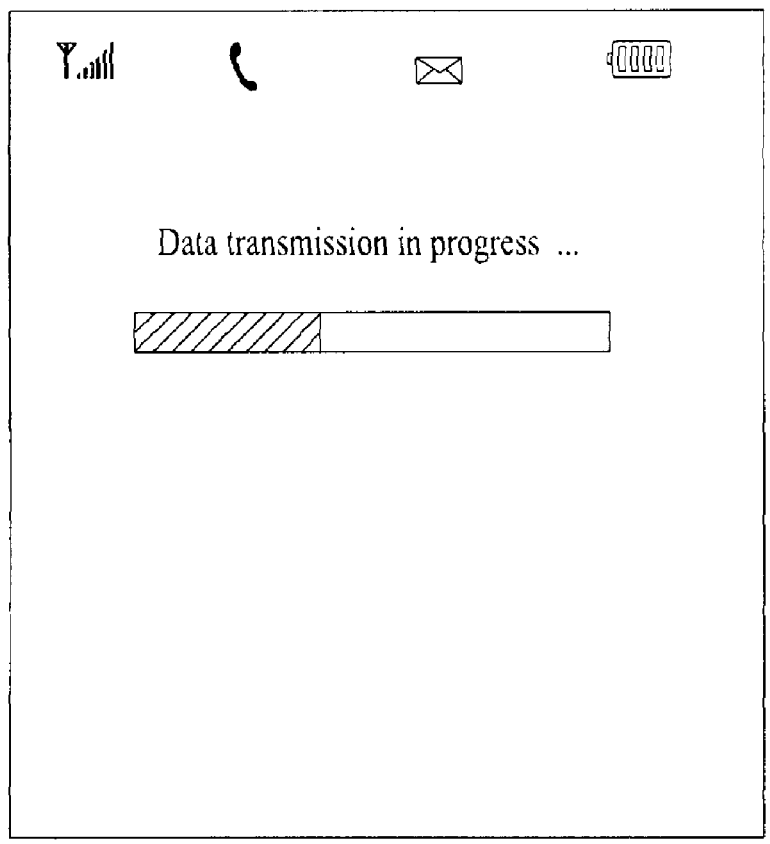
Figure 10B:
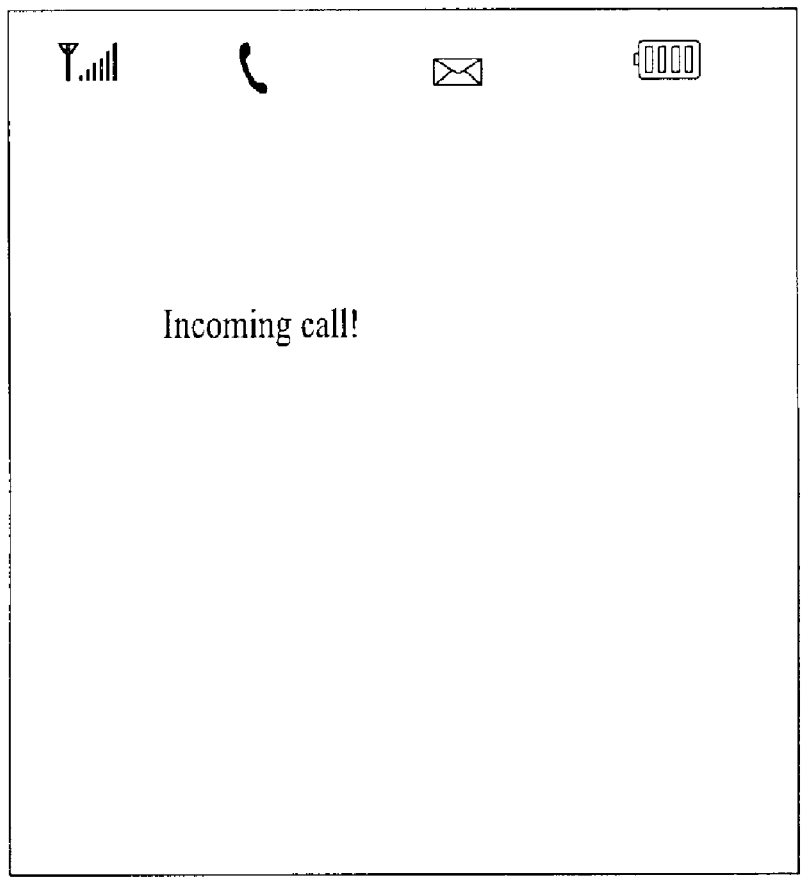
Figure 10C:
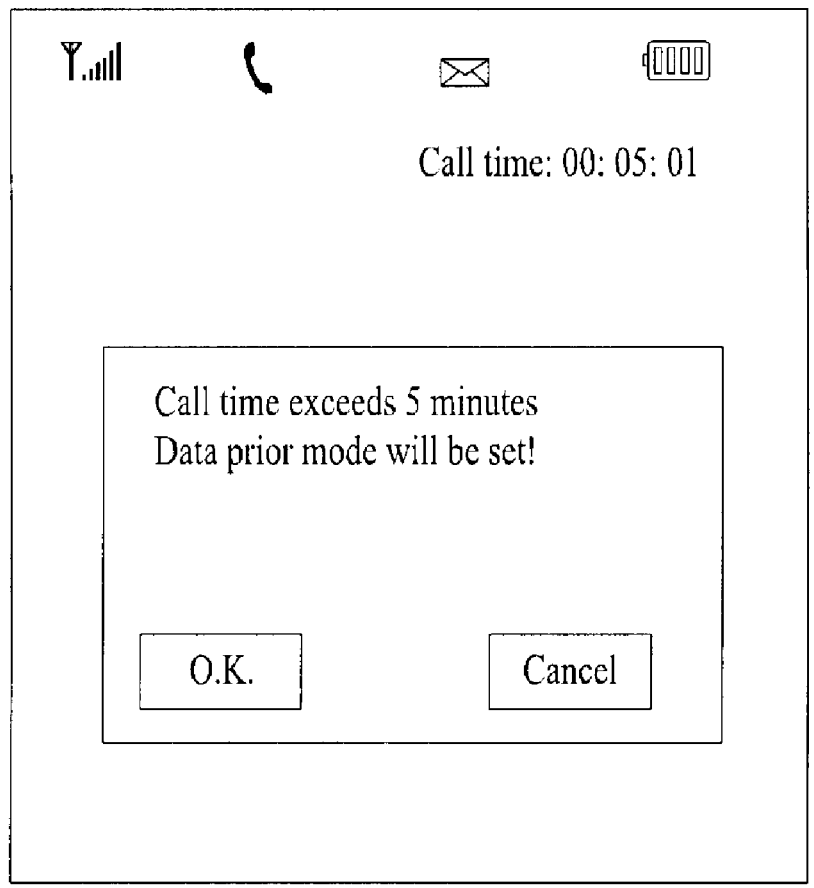

Referring to FIGS. 10A to 10C, while a data transceiving operation by a user datagram protocol (UDP) is performed [FIG. 10A], in case of receiving a call signal [FIG. 10B], the mobile terminal 100 is able to connect the call signal.

If a connected time of the connected call signal exceeds a predetermined time, as the data transceiving operation by the UDP may be terminated, the mobile terminal 100 sets up a data prior mode and is then able to externally announce that the data prior mode has been set up [FIG. 10C].

In case that the call signal is ended within the predetermined time, it is ale to resume the data transceiving operation by the UDP from a call signal connected timing point. Yet, if the call signal is not ended within the predetermined time, the data transceiving operation by the UDP should be start all over again from the first.

In FIGS. 8A to 10C, as a data prior mode setup is externally announced, a user is able to recognize that a further call signal transceiving operation will not be normally operated. In particular, the user becomes aware that a currently performed data transceiving operation will not be interrupted by the call signal transceiving operation.

Referring now to FIG. 5, in case of detecting a call signal transceiving operation [S540], the mobile terminal 100 preferentially performs the data transceiving operation, which is being performed in the performing step S510, instead of performing the detected call signal transceiving operation under the control of the controller 180 [S550].

In particular, as the data prior mode is set, the mobile terminal 100 is able to exclusively perform the data transceiving operation rather than the call signal transceiving operation.

Therefore, the mobile terminal 100 is able to safely perform the data transceiving operation without being interrupted by the call signal.

Subsequently, the mobile terminal 100 determines whether the data transceiving operation performed in the performing step S550 is ended, under the control of the controller 180 [S560]. As a result of the determination, if the data transceiving operation is ended, the mobile terminal 100 is able to cancel (or release) data prior mode having been set up in the setting step S530, under the control of the controller 180 [S570].

Figure 11:
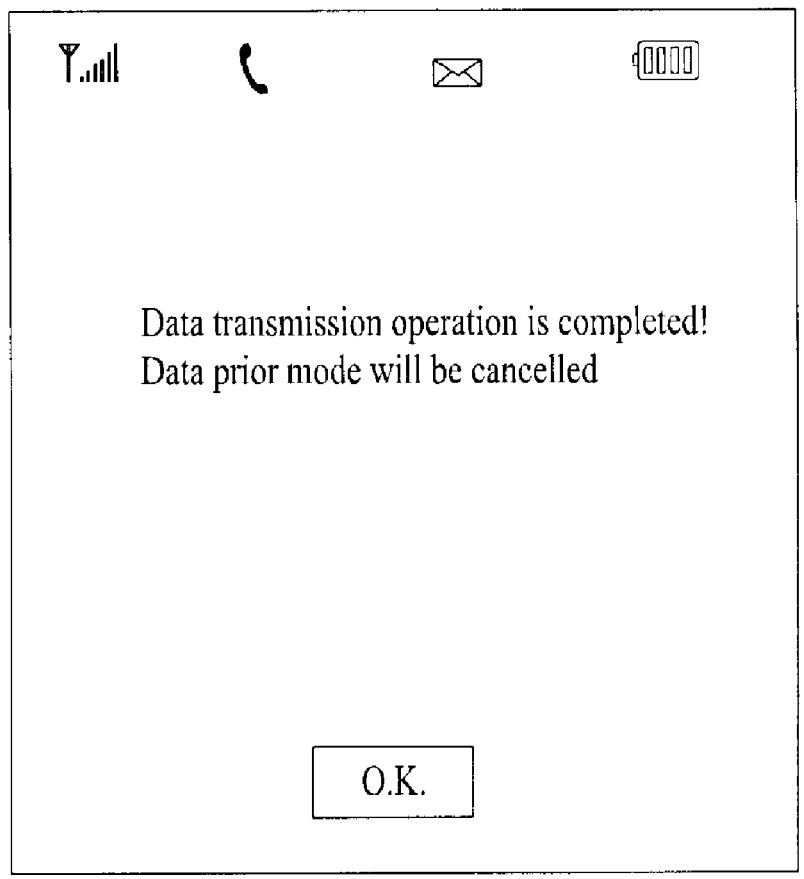
FIG. 11 is a diagram of a screen configuration of a data prior mode cancellation after completion of a data transceiving operation according to one embodiment of the present invention.

FIG. 11 is a diagram of a screen configuration of a data prior mode cancellation after completion of a data transceiving operation according to one embodiment of the present invention.

Optionally, as the data prior mode is canceled in the releasing step S570, the mobile terminal 100 automatically returns to the hybrid mode or is able to set one of a call signal prior mode, a data prior mode and a hybrid mode according to a selection made by a user.

If the data transceiving operation performed in the performing step S550 is ended, the mobile terminal is able to output information on the call signal receiving operation rejected due to the prior execution of the data transceiving operation, under the control of the controller 180.

For instance, after completion of the data transceiving operation, the mobile terminal 100 is able to make a request for information on the execution-rejected call signal transceiving operation to a server according to a selection made by a user. As a result of the request, the mobile terminal 100 is able to receive the corresponding information from the corresponding server. Alternatively, the mobile terminal 100 stores the information on the call signal transceiving operation detected in the course of the data transceiving operation and is then able to output the stored information according to a selection made by a user after completion of the data transceiving operation.

Figure 12A:
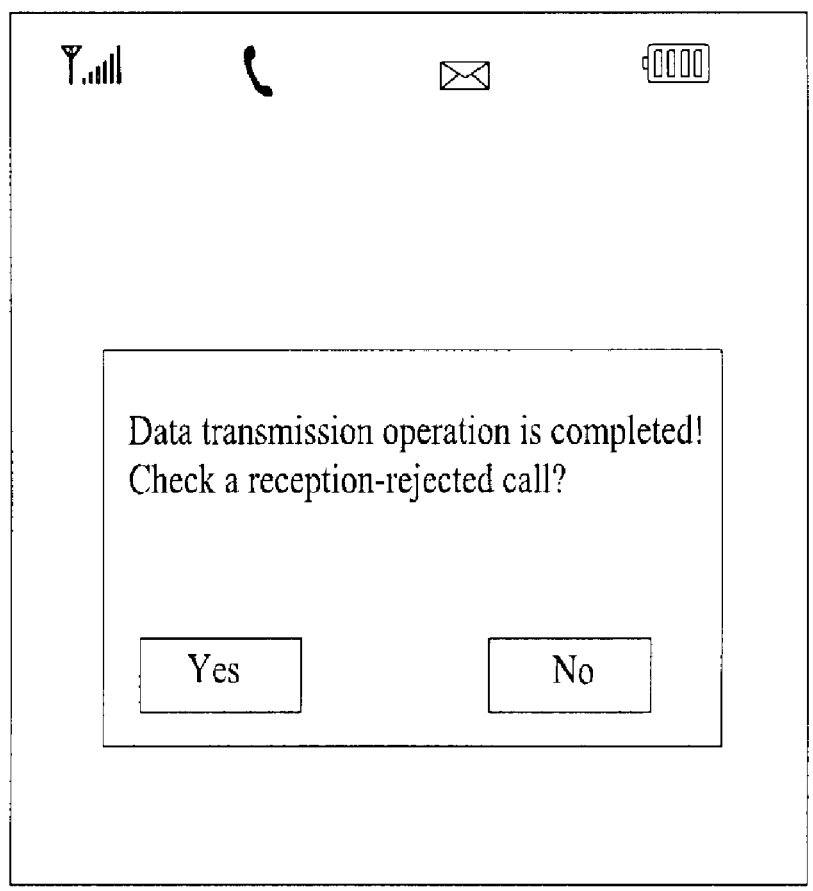
FIG. 12A and FIG. 12B are diagrams of screen configurations for outputting information on a reception-rejected call signal after completion of a data transceiving operation according to one embodiment of the present invention.
Figure 12B:
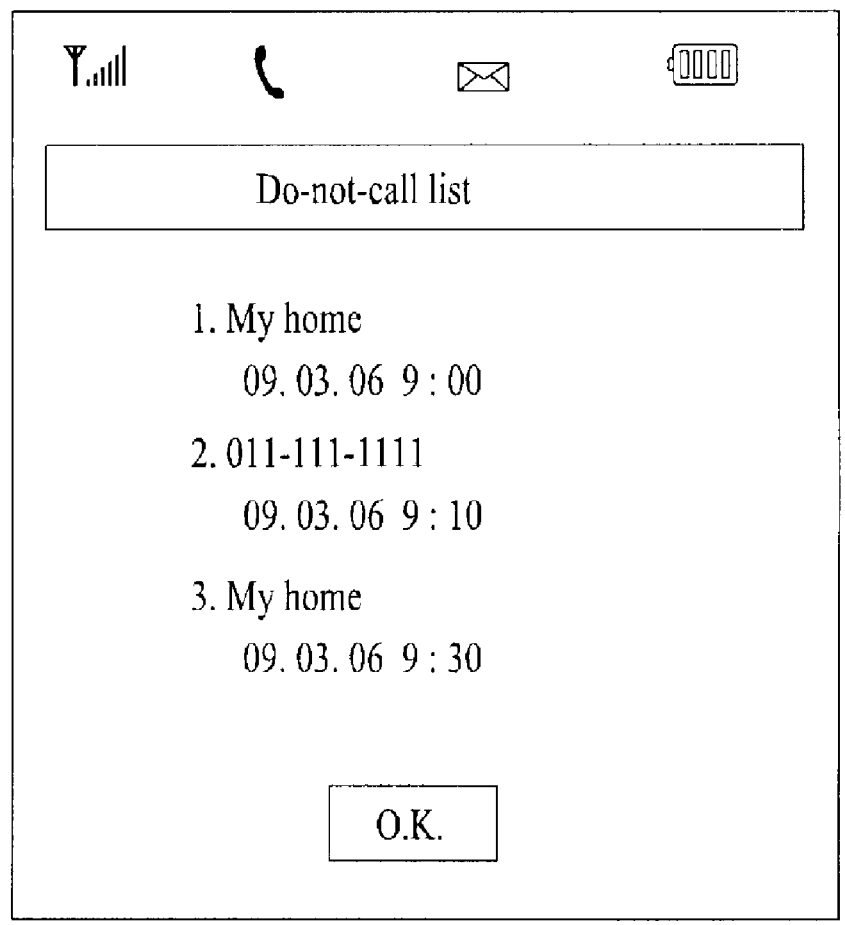

FIG. 12A and FIG. 12B are diagrams of screen configurations for outputting information on a reception-rejected call signal after completion of a data transceiving operation according to one embodiment of the present invention.

Referring to FIG. 12A and FIG. 12B, the information on the reception-rejected call signal can include a phone number of a correspondent party terminal, a storage name, a call-received time information and/or the like, for example.

Accordingly, the present invention provides the following effects and/or advantages.

First of all, in case that a prior execution condition is met while a hybrid mode is set, it is able to set a data prior mode. Therefore, a data transceiving operation can be safely performed without interruption caused by a call signal transceiving operation.

Secondly, the present invention enables prior execution conditions to be set in various ways according to a selection made by a user. Therefore, even if a hybrid mode is set, the present invention enables a data transceiving operation to be preferentially performed in various statuses that meet the prior execution conditions.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal for selectively performing a data transceiving operation or a call signal transceiving operation, the mobile terminal comprising:
   a display unit configured to display information;
   a wireless communication unit configured to perform the data transceiving operation; and
   a control unit configured to set up a data prior mode for enabling the data transceiving operation to be performed prior to the call signal transceiving operation if the data transceiving operation meets a prior execution condition while the data transceiving operation is performed by the wireless communication unit,
   wherein the wireless communication unit is further configured to preferentially perform the data transceiving operation if the data prior mode is set up by the control unit and the call signal transceiving operation is detected,
   wherein the control unit is further configured to control the display unit to output information regarding the detected call signal transceiving operation upon completing the preferential performance of the data transceiving operation, and
   wherein the control unit is further configured to control the display unit to display an indicator indicating that the data prior mode is set up.

2. The mobile terminal of claim 1, wherein the prior execution condition comprises at least a data size, a size of data transceived for a predetermined period of time, a presence or non-presence of a data transmission and reception by a transmission control protocol (TCP), a presence or non-presence of a data transmission and reception by an instant messaging service (IMS), a presence or non-presence at a specific place, a presence or non-presence of belonging to a specific time zone, a presence or non-presence of a data upload or download over a predetermined time or a presence or non-presence of a specific service via the Internet.

3. The mobile terminal of claim 2, wherein the control unit is further configured to set up the data prior mode if the prior execution condition comprises the data size and a size of data transceived in the data transceiving operation is greater than a predetermined size.

4. The mobile terminal of claim 2, wherein the control unit is further configured to set up the data prior mode if the prior execution condition comprises the size of data transceived for the predetermined period of time and a size of data transceived in the data transceiving operation for the predetermined period of time is greater than a predetermined size.

5. The mobile terminal of claim 1, wherein the control unit is further configured to set up the prior execution condition.

6. The mobile terminal of claim 1, wherein the control unit is further configured to determine whether the data transceiving operation meets the prior execution condition at a start of the performance of the data transceiving operation or at a random timing point during the performance of the data transceiving operation.

7. The mobile terminal of claim 1, wherein the control unit is further configured to cancel the set data prior mode if the preferential performance of the data transceiving operation is ended.

8. The mobile terminal of claim 1, wherein the control unit is further configured to set up the data prior mode if the prior execution condition comprises a predetermined specific communication service and the data transceiving operation is performed using the predetermined specific communication service.

9. The mobile terminal of claim 1, wherein the wireless communication unit is further configured to perform the data transceiving operation instead of the call signal transceiving operation if the data prior mode is set up by the control unit and the call signal transceiving operation is detected.

10. The mobile terminal of claim 1, wherein the information regarding the detected call signal transceiving operation comprises at least a phone number or a reception time of a reception-rejected call corresponding to the detected call signal transceiving operation.

11. A method of controlling data transmission and reception in a mobile terminal configured to selectively perform a data transceiving operation or a call signal transceiving operation, the method comprising:
   performing the data transceiving operation;
   determining whether the data transceiving operation meets a prior execution condition while the data transceiving operation is performed;
   setting up a data prior mode for enabling the data transceiving operation to be performed prior to the call signal transceiving operation if it is determined that the data transceiving operation meets the prior execution condition;
   preferentially performing the data transceiving operation if the data prior mode is set up and the call signal transceiving operation is detected;
   outputting information regarding the detected call signal transceiving operation upon completing the preferential performance of the data transceiving operation; and
   displaying an indicator indicating that the data prior mode is set up.

12. The method of claim 11, wherein the prior execution condition comprises at least a data size, a size of data transceived for a predetermined period of time, a presence or non-presence of a data transmission and reception by a transmission control protocol (TCP), a presence or non-presence of a data transmission and reception by an instant messaging service (IMS), a presence or non-presence at a specific place, a presence or non-presence of belonging to a specific time zone, a presence or non-presence of a data upload or download over a predetermined time or a presence or non-presence of a specific service via the Internet.

13. The method of claim 11, further comprising setting up the prior execution condition.

14. The method of claim 11, further comprising releasing the set data prior mode if the preferential performance of the data transceiving operation is ended.

15. The method of claim 11, wherein preferentially performing the data transceiving operation comprises performing the data transceiving operation instead of the call signal transceiving operation.

16. The method of claim 11, wherein the information regarding the detected call signal transceiving operation comprises at least a phone number or a reception time of a reception-rejected call corresponding to the detected call signal transceiving operation.

* * * * *